United States Patent [19]
Young et al.

[11] Patent Number: 6,151,645
[45] Date of Patent: Nov. 21, 2000

[54] COMPUTER COMMUNICATES WITH TWO INCOMPATIBLE WIRELESS PERIPHERALS USING FEWER TRANSCEIVERS

[75] Inventors: Bruce A. Young, LeMars; Mark Rapaich, Westfield, both of Iowa

[73] Assignee: Gateway 2000, Inc., North Sioux City, S. Dak.

[21] Appl. No.: 09/131,252

[22] Filed: Aug. 7, 1998

[51] Int. Cl.[7] ................................................ G06F 13/12
[52] U.S. Cl. ............................................ 710/63; 710/126
[58] Field of Search .................................. 710/63, 62, 1, 710/126, 129

[56] References Cited

U.S. PATENT DOCUMENTS

| | | | |
|---|---|---|---|
| 5,307,297 | 4/1994 | Iguchi et al. | 364/708.1 |
| 5,321,801 | 6/1994 | Ando | 395/145 |
| 5,339,095 | 8/1994 | Redford | 345/158 |
| 5,375,165 | 12/1994 | Haber et al. | 379/90 |
| 5,473,347 | 12/1995 | Collas et al. | 345/169 |
| 5,504,483 | 4/1996 | Hoffmann et al. | 341/22 |
| 5,515,051 | 5/1996 | Tanaka et al. | 341/174 |
| 5,563,631 | 10/1996 | Masunaga | 345/169 |
| 5,579,496 | 11/1996 | Van Steenbrugge | 395/567 |
| 5,594,470 | 1/1997 | Meyerson et al. | 345/169 |
| 5,864,708 | 1/1999 | Croft et al. | 710/1 |
| 5,935,224 | 8/1999 | Svancarek et al. | 710/63 |
| 5,991,546 | 11/1999 | Chan et al. | 710/62 |

OTHER PUBLICATIONS

Messmer, H., "The Indispensable PC Hardware Book—Your Hardware Questions Answered", Second Edition, Addison–Wesley Publishing Company, 919–53, (1995).

Primary Examiner—Ario Etienne
Attorney, Agent, or Firm—Schwegman, Lundberg, Woessner & Kluth, P.A.

[57] ABSTRACT

Computer systems provide separate ports for USB (Universal Serial Bus) and PS2 peripherals. Unfortunately, this arrangement requires the computer to have two separate wireless transmitters to communicate with wireless USB and PS2 peripherals. Accordingly, the present invention provides a device, a method, and a system for combining PS2 data and USB data into one serial data stream, thereby enabling one wireless transmitter to serve both a PS2 and a USB peripheral. Specifically, one embodiment includes a PS2 port for receiving PS2 data; a USB port for receiving USB data; a data combiner, coupled to the PS2 and USB ports, for combining the PS2 and the USB data; and a wireless transmitter, coupled to the data combiner, for broadcasting a wireless signal carrying combined PS2 and USB data. In one embodiment, the data combiner includes a processor and a memory that stores unique data-combining software.

12 Claims, 3 Drawing Sheets

COMPUTER COMMUNICATES WITH TWO INCOMPATIBLE WIRELESS PERIPHERALS USING FEWER TRANSCEIVERS

FIELD OF THE INVENTION

The present invention concerns computer systems, particularly systems that communicate with incompatible wireless peripherals.

BACKGROUND OF THE INVENTION

Computer systems, particularly personal computers, typically include a central processing unit and a number of peripheral, or auxiliary, devices, such as keyboards, mice, disk drives, printers, speakers, microphones, videocassette recorders, optical-disk players, and even cameras, that communicate with the central processing unit. The central processing unit and the peripheral devices usually communicate via a two-way wired or wireless communications channel, known as a serial bus, which transfers data as a stream of electric signals representing a sequence of ones and zeros.

In both wired and wireless cases, communications typically follow a packet communications protocol, which entails segmenting the sequence of ones and zeros into packets further segmented into subpackets, known as fields. A packet usually includes a packet-identifier field, an address field, and a data field, with each field having a size, or length, dependent on the number of bits, or ones and zeros, it contains.

One packet communications protocol is the PS2 (PS/2 or DOS-compatible) protocol used for communications between pointing devices, such as mice, and a central processing unit. (PS/2 is a trademark of the International Business Machines Corporation.) PS2 peripherals, peripherals that use the PS2 protocol, are generally connected to a personal computer using a PS2 connector that mates with a PS2 communications port on the computer. For wireless PS2 peripherals, the PS2 communications port includes a wireless transceiver.

Recently, an alternative protocol, the Universal Serial Bus (USB) protocol, has been developed to overcome shortcomings of the PS2 protocol, specifically its inability to handle audio, compressed video, and other high-data-rate signals. USB peripherals, that is, peripherals that use the USB protocol requires a unique connector that connects to a communications port on a personal computer. Like PS2 ports, USB ports may also include a wireless transceiver for wireless USB peripherals.

To communicate with both PS2 and USB peripherals, existing personal computers must include a PS2 port for peripherals requiring the PS2 protocol and a separate USB port for peripherals requiring the USB protocol. This creates a problem when using wireless USB and PS2 peripherals with the same personal computer. Specifically, using both types of wireless peripherals currently requires two wireless transmitters, one for the wireless PS2 peripheral and another for the wireless USB peripheral. This arrangement increases the cost of both peripherals and may ultimately lead many consumers to forego the convenience of one of the wireless peripherals.

Accordingly, there is a need for systems, devices, and methods that enable cost-effective, side-by-side use of wireless PS2 and USB peripherals.

SUMMARY OF THE INVENTION

To address these and other needs, the present inventors teach a system, device, and method for combining PS2 data and USB data into one serial data stream or sequence, thereby enabling one wireless transmitter to serve both a PS2 and a USB peripheral. The teaching in these embodiments are applicable to communications between one device and any number of devices having different communications protocols.

One exemplary system includes a computer having PS2 and USB ports for outputting PS2 and USB data; a PS2-USB wireless interface device coupled to the PS2 and USB ports for receiving PS2 and USB data and for broadcasting a combined PS2-USB data signal; a PS2 peripheral for receiving the combined PS2-USB data signal and responding to the PS2 data; and a USB peripheral for receiving the combined PS2-USB data signal and responding to the USB data. In some embodiments, the PS2 peripheral is a wireless mouse, and the USB peripheral is a wireless keyboard.

One exemplary interface device includes: a PS2 port for receiving PS2 data; a USB port for receiving USB data; a data combiner, coupled to the PS2 and USB ports, for combining the PS2 and the USB data; and a wireless transmitter, coupled to the data combiner, for broadcasting a wireless signal carrying combined PS2 and USB data. In this example, the data combiner includes a processor and a memory that stores unique data-combining software.

And, one exemplary method for combining PS2 and USB data entails tagging the PS2 data with a PS2 tag to form tagged PS2 data; tagging the USB data with a USB tag to form tagged USB data; and combining the tagged PS2 data and the tagged USB data. Combining the data entails concatenating the tagged PS2 data and the tagged USB data. More generally, the method combines first and second data, which conforms to different protocols, by tagging the data with respective first and second tags and then combining the tagged first and second data.

In sum, the system, device, and method of the present invention enables one wireless transceiver to serve both a PS2 and a USB peripheral, thereby facilitating costeffective, side-by-side use of wireless PS2 and USB peripherals.

DESCRIPTION OF THE PREFERRED EMBODIMENTS

The following detailed description, which references and incorporates FIGS. 1–4, describes and illustrates specific embodiments, or versions, of the invention. These embodiments are described in sufficient detail to enable those skilled in the art to practice the invention. Thus, where appropriate to avoid obscuring the invention, the description may omit certain information known to those of skill in the art.

Figure 1:
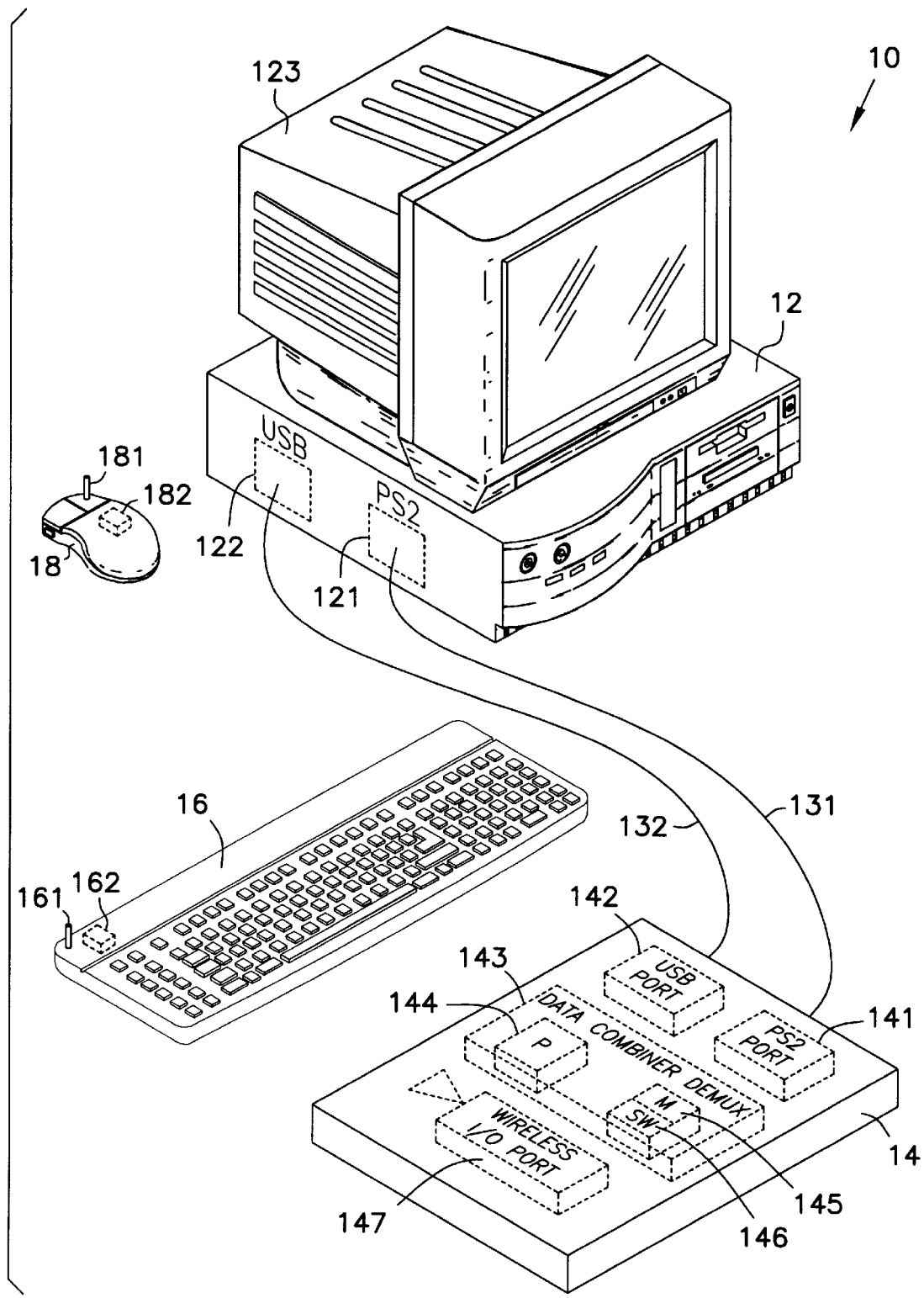
FIG. 1 is a diagram of a computer system incorporating the teachings of the present invention.

FIG. 1 shows an exemplary embodiment of a computer system 10 that incorporates the teachings of the present invention. Computer system 10 includes a computer 12, a PS2-USB interface device 14, a wireless PS2 keyboard 16, and a wireless USB mouse 18.

Computer 12, preferably a Gateway 2000 model G6 from Gateway 2000, Inc. of North Sioux City, S.Dak., includes PS2 port 121, USB port 122, and a monitor 123. PS2 port 121 outputs packets of serial data according to the PS2 specification or protocol commonly used for mice and other pointing devices. (This protocol may also be designated PS/2 or DOS-compatible.) The packets, commonly called mouse data packets, include eight bytes. The first, or least-significant, byte 00h has the following ordered sequence of bits (most significant to least significant): y-data-overflow (YOV) bit, x-data-overflow (XOV) bit, y-value-negative bit (YNG), x-value-negative(XNG) bit, reserved bit, reserved bit, right-button-pressed (RIG) bit, left-button-pressed (LEF) bit. The two reserved bits are usually set to 0. Bytes 02h, 04h, and 06h provide respective x, y, and z motion data, with the z-motion data usually fixed at 00h. The remaining bytes are reserved.

Similarly, USB port 122 outputs packets of serial data according to a past, present, or future version of the Universal Serial Bus Specification, such as the Final Revision of version 1.0 dated Nov. 13, 1995 which is incorporated herein by reference. In part, the Specification provides that all bus transactions include up to three packets. Each transaction begins with a token packet describing the type and direction of the transaction, and including the USB device address that identifies the destination of the packet. The transaction also includes a data packet containing relevant data, such as keystroke or mouse positional data. Alternatively, a no-data signal is communicated. Lastly, the destination device provides a handshake (or response) packet indicating if the transaction was successful or not.

Connected to ports 121 and 122 is PS2-USB interface device 14. Interface device 14 includes PS2 and USB ports 141 and 142, a data combiner 143, and a wireless input-output port 147. (As used herein, "wireless" generally refers to signals that propagate through air and devices that send and/or receive such signals. Thus, for example, the term encompasses ultrasonic, infrared, and RF signals and devices.) Respective PS2 and USB ports 141 and 142, connected via PS2 and USB cable assemblies 131 and 132 to respective PS2 and USB ports 121 and 122, receive serial PS2 and USB data from computer 12. In this exemplary embodiment, data combiner 143 includes a processor 144 and a computer-readable data-storage medium 145 that stores data-combining software 146 for operating the processor to combine the PS2 and USB data into a combined PS2-USB serial data signal. Data-storage medium 145, in various other embodiments, includes one or more of the following: a read-only memory (ROM), a random-access-memory (RAM), an electrically-erasable and programmable-read-only memory (EEPROM), an optical disk, a floppy disk. In other embodiments, data combiner 143 may include functionally equivalent hardware or a combination of hardware and software.

Figure 2:
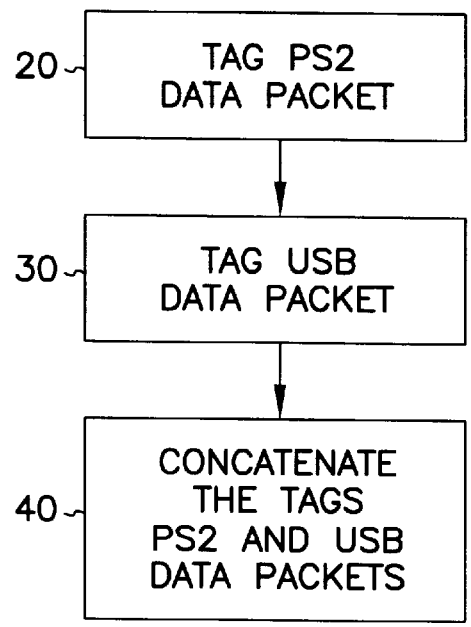
FIG. 2 is a flowchart illustrating an exemplary method for combining USB and PS2 data.

Data-combining software 146, acting as a device driver, causes processor 144 to combine the PS2 and USB data according to the exemplary method shown in FIG. 2. More precisely, step 20 of the method entails tagging a packet of PS2 data with a PS2 identifier to form tagged PS2 data. Step 30 entails tagging a packet of USB data with a USB identifier to form tagged USB data. Tagging preferably includes appending the PS2 and USB identifiers to the beginning of the respective PS2 and USB data packets.

The next step, shown as step 40, entails concatenating the tagged PS2 data and the tagged USB data, to form a packet of combined PS2-USB data. This concatenation preferably includes appending the tagged PS2 data to the last bit of the tagged USB data. However, in other embodiments, the tagged PS2 and USB data are sent as a sequence of separate packets, interleaved such that every other packet type differs from the preceding packet type or distributed in a random or pseudorandom order dependent on the operations of the PS2 and USB peripherals.

Figure 3:
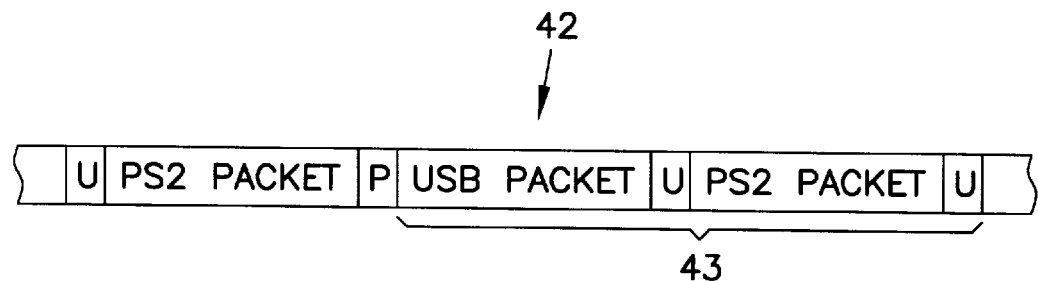
FIG. 3 is a diagram of a serial data stream comprising combined USB and PS2 data.

FIG. 3 shows a sample portion of a data stream 42 of combined PS2-USB data packets, such as packet 43. In the Figure, the Ps represent PS2 data tags and Us represent USB data tags. In the exemplary embodiments, these data tags are one-bit in length, with a "0" representing a PS2 data tag and a "1" representing a USB data tag. However, in other embodiments, each data tags is two or more bits. Moreover, other embodiments omit tagging and simply concatenate or serialize the USB and PS2 data packets according to the order of receipt from computer 12.

After combining the PS2 and USB data, data combiner 143, in FIG. 1, serially outputs the packet of combined PS2-USB data to wireless input-output port (transceiver) 147, which, in turn, broadcasts a combined PS2-USB data signal, representing the packet, to PS2 keyboard 16 and USB mouse 18 (or any type of PS2 or USB peripheral). Keyboard 16 and mouse 18 receive the combined PS2-USB serial data signal via respective antennae 161 and 181. PS2 keyboard 16 responds to the PS2 data portion of the combined PS2-USB data signal, and USB mouse 18 responds to the USB data portion of the combined PS2-USB data signal.

In the exemplary embodiment, keyboard 16 and mouse 18 each have respective wireless input-output ports (transceivers) 162 and 182 and data detection logic for detecting the tag attached to each portion of the combined PS2-USB data signal. However, in other embodiments, keyboard 16 and mouse 18 only transmit data. The data detection logic enables USB mouse 18 to reject or ignore the PS2 portion of the combined signal because of the attached tag identifying the data as PS2 data. Similarly, the data detection logic in PS2 keyboard 16 rejects or ignores the USB portion of the combined PS2-USB data signal because of the attached tag identifying this portion of the data signal as USB data.

After rejection of the respectively inapplicable portions of the combined PS2-USB data signal, keyboard 16 and mouse 18 process or respond to the remaining portion of the combined data signal, for example, by changing certain operational characteristics of the keyboard or mouse. In addition, keyboard 16 and mouse 18 also conventionally send respective USB signals representing keystrokes and PS2 signals representing mouse movement or mouse clicks to interface device 14. Interface 14 receives both the USB and the PS2 signals, communicating the USB signals through USB port 142 to computer 12 and the PS2 signals through PS2 port 141 to computer 12.

Figure 4:
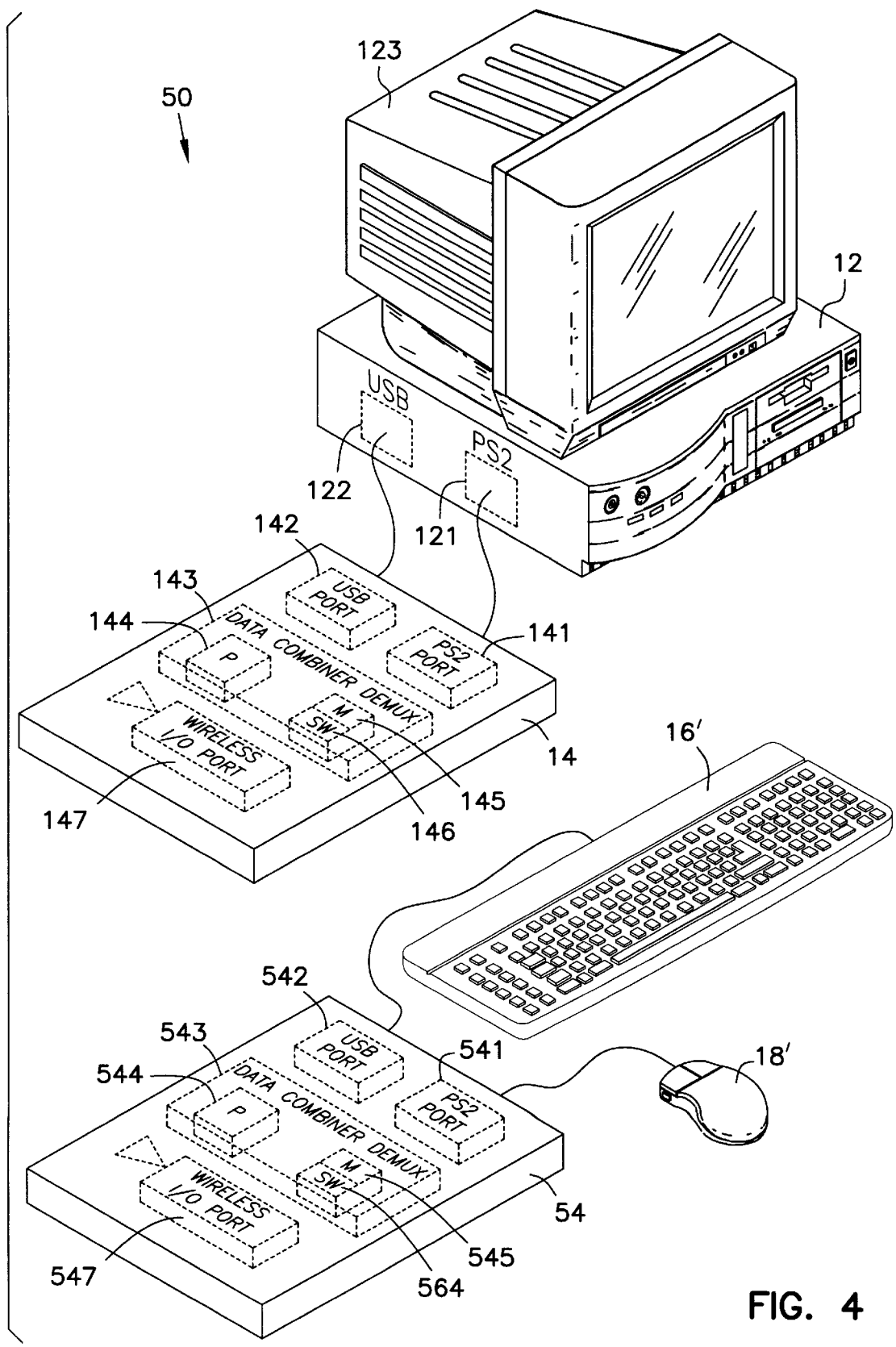
FIG. 4 is a diagram of another computer system incorporating the teachings of the present invention.

FIG. 4 shows another computer system 50 which operates in a manner similar to computer system 10. System 50 differs from system 10 in that keyboard 16' and mouse 18' are not wireless devices and are thus coupled to a second interface device 54 which allows them to communicate with computer 12 via interface device 14.

In the embodiment shown in FIG. 4, interface device 54 has a structure and function that parallel interface device 14. Thus, interface device 54 includes PS2 and USB ports 541 and 542, a data combiner-demultiplexer 543, and a wireless input-output port 547. Data combiner-demultiplexer 543 includes processor 544, memory 546, and data-combining software 546. Respective PS2 and USB ports 541 and 542 are connected respectively via PS2 and USB cable assemblies 531 and 532 to mouse 18' and keyboard 16'.

In operation, mouse 18' and keyboard 16' send data via the cable assemblies to respective ports 541 and 542, and data combiner-demultiplexer 543 combines the data and transmits a combined PS2-USB data signal to wireless input-output port 547. Port 547 transmits the combined PS2-USB data signals to interface device 14, which in turn communicates the PS2 and USB portions of the data signal via respective PS2 port 141 and USB port 142 to computer 12. In other embodiments, interface 54 merely concatenates the data from keyboard 16' and mouse 18' without tagging it, and interface 14 distinguishes the USB and PS2 data based on inherent differences, before channeling it to PS2 port 141 or USB port 142. For example, interface 14 may distinguish the PS2 data from the USB data by discerning the reserved packets or reserved bits or z-data of the mouse data packets or by looking for the USB device address or handshake packet of the USB data.

Thus, system 50 provides a wireless interface system for computer systems using combinations of nonwireless peripherals that would otherwise require separate wireless interface devices. One may even extend system 50 to accommodate wireless communications between computer 12 and monitor 123, thereby untethering the monitor from the computer and ultimately providing greater flexibility in physically arranging computer systems.

Conclusion

Various embodiments of the present invention eliminate the need to provide a computer with separate USB and PS2 wireless transmitters to communicate with wireless USB and PS2 peripherals. One embodiment includes an interface device that connects to the USB and PS2 ports of a computer and outputs a combined USB-PS2 data signal to a wireless USB keyboard and a wireless PS2 mouse, which respond to relevant portions of the combined signal. Another embodiment, intended for use with nonwireless USB and PS2 peripherals, includes two interface devices: a first one connected via cables to a computer and a second one connected via cables to a USB keyboard and PS2 mouse. The first and second interfaces communicate via wireless signals, allowing the USB keyboard and PS2 mouse to function wirelessly with respect to the computer using only two wireless transceivers instead of four. Thus, these embodiments of the present invention enable substantial cost reductions in providing wireless interfaces for systems having peripherals that use different communication protocols.

The embodiments described above are intended only to illustrate and teach one of more ways of implementing or practicing the present invention, not to restrict its breadth or scope. The actual scope of the invention, which encompasses all ways of practicing or implementing the invention, is defined only by the following claims and their equivalents.

What is claimed is:

1. A system comprising:
   a computer having PS2 and USB ports for respectively outputting or receiving PS2 and USB data;
   a PS2-USB interface device, coupled to the PS2 and USB ports, for receiving PS2 and USB data and for outputting a combined PS2-USB data signal;
   a wireless PS2 peripheral for receiving the combined PS2-USB data signal or outputting PS2 data; and
   a wireless USB peripheral for receiving the combined PS2-USB data signal or outputting USB data.

2. The system of claim 1, wherein the PS2-USB interface device comprises:
   a PS2 port coupled to the PS2 port of the computer for receiving PS2 data;
   a USB port coupled to the USB port of the computer for receiving USB data;
   a data combiner, coupled to the PS2 and USB ports, for combining the PS2 and the USB data; and
   an output port, coupled to the data combiner, for outputting a signal carrying combined PS2 and USB data.

3. The system of claim 1, wherein the data combiner includes:
   a processor; and
   a computer-readable storage medium which stores software for causing the processor to combine the PS2 and USB data.

4. The system of claim 3, wherein the software includes instructions for:
   tagging a PS2 identifier on the PS2 data to form tagged PS2 data;
   tagging a USB identifier on the USB data to form tagged USB data; and
   concatenating the tagged PS2 data and the tagged USB data.

5. The system of claim 1, wherein the PS2 peripheral includes one of a wireless pointing device and a keyboard, and the USB peripheral includes the other of the wireless pointing device and the keyboard.

6. A system comprising:
   a computer having a non-virtual PS2 port, and a non-virtual USB port;
   a first wireless device connected to the non-virtual PS2 port and the non-virtual USB port;
   a PS2 peripheral having a PS2 port;
   a USB peripheral having a USB port; and
   a second wireless device connected to the PS2 port of the PS2 peripheral and to the USB port of the USB peripheral to enable wireless communications between the peripherals and the computer via the first wireless device.

7. The system of claim 6, wherein the PS2 peripheral includes one of a pointing device and a keyboard, and the USB peripheral includes the other of the pointing device and the keyboard.

8. The system of claim 6, wherein the first wireless device is external to a housing for the computer.

9. The system of claim 6, wherein the first wireless device comprises:
   a first PS2 port coupled to the PS2 port of the computer for receiving PS2 data;
   a first USB port coupled to the USB port of the computer for receiving USB data;
   a first data combiner-demultiplexer, coupled to the PS2 and USB ports, for combining the PS2 and the USB data and to the first wireless; and
   a first wireless transceiver, coupled to the first data combiner-demultiplexer, for outputting a signal carrying combined PS2 and USB data.

10. The system of claim 9, wherein the second wireless device comprises:
    a second wireless transceiver for receiving the signal carrying combined PS2 and USB data;
    a second data combiner-demultiplexer coupled to the second wireless transceiver for demultiplexing the signal into PS2 and the USB data signals; and
    a second PS2 port connected between the second data combiner-demultiplexer and the PS2 port of the PS2 peripheral to transfer the PS2 data signal to the PS2 peripheral; and
    a second USB port connected between the second data combiner-demultiplexer and the USB port of the USB peripheral to transfer the USB data signal to the USB peripheral.

11. A computer system comprising:
    a PS2 peripheral having a first wireless transmitter for outputting a wireless PS2 data signal;

a USB peripheral having a second wireless transmitter for outputting a wireless USB data signal; and a single wireless receiver for receiving the wireless PS2 data signal and the wireless USB data signal.

12. A computer system comprising:

a wireless PS2 peripheral for receiving a wireless combined PS2-USB data signal or outputting a wireless PS2 data signal;

a wireless USB peripheral for receiving a wireless combined PS2-USB data signal or outputting a wireless USB data signal; and a single wireless transceiver for receiving the wireless PS2 data signal and the wireless USB data signal and for outputting a wireless combined PS2-USB data signal.

* * * * *